(12) United States Patent
Sakamoto et al.

(10) Patent No.: US 6,505,570 B1
(45) Date of Patent: Jan. 14, 2003

(54) METHOD FOR FORMING A FOAMED PRODUCT INTEGRAL WITH TRIM COVER ASSEMBLY

(75) Inventors: Ikuo Sakamoto; Kazuyuki Sugimoto, both of Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/994,694

(22) Filed: Nov. 28, 2001

(51) Int. Cl.$^7$ .................. D05B 13/00; D05B 15/00; B29C 67/20
(52) U.S. Cl. .................. 112/470.27; 112/475.08
(58) Field of Search .................. 112/470.27, 441, 112/162, 475.04, 475.26, 475.08, 10; 264/41, 45.5, 259; 156/93

(56) References Cited

U.S. PATENT DOCUMENTS

| | | | |
|---|---|---|---|
| 4,928,609 A | * 5/1990 | Kawasaki | 112/148 |
| 4,987,666 A | * 1/1991 | Smith | 264/45.1 |
| 5,130,074 A | * 7/1992 | Sakamoto et al. | 264/259 |
| 5,669,670 A | 9/1997 | Haraguchi et al. | |
| 5,687,662 A | 11/1997 | Kawasaki | |
| 5,722,336 A | * 3/1998 | Takeuchi | 112/162 |
| 5,732,641 A | * 3/1998 | Kawasaki | 112/152 |

\* cited by examiner

*Primary Examiner*—Ismael Izaguirre
(74) *Attorney, Agent, or Firm*—Browdy and Neimark, P.L.L.C.

(57) ABSTRACT

Method for forming a foamed product integral with trim cover assembly, in which a foam padding piece and a surface cover piece are formed such that the former is small in size relative to the latter. According to the method, the peripheral ends of the foam padding piece are aligned and sewn with the peripheral ends of the surface cover piece to form a cover section. A plurality of such cover sections are provided and are bent at their respective end portions, stretching each surface cover piece on and over each foam padding piece, after which, the thus-bend end portions of cover sections are sewn with one another to form a three-dimensional trim cover assembly. A liquid foaming material is injected and cured in that trim cover assembly to form a foamed product integral with the trim cover assembly.

7 Claims, 4 Drawing Sheets

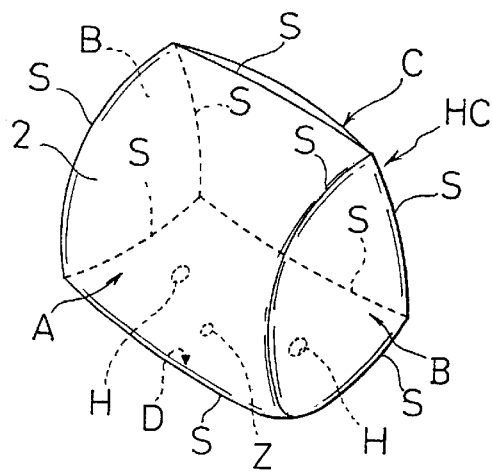
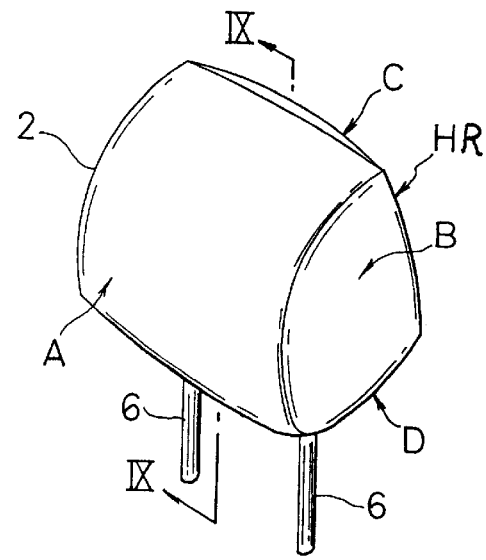
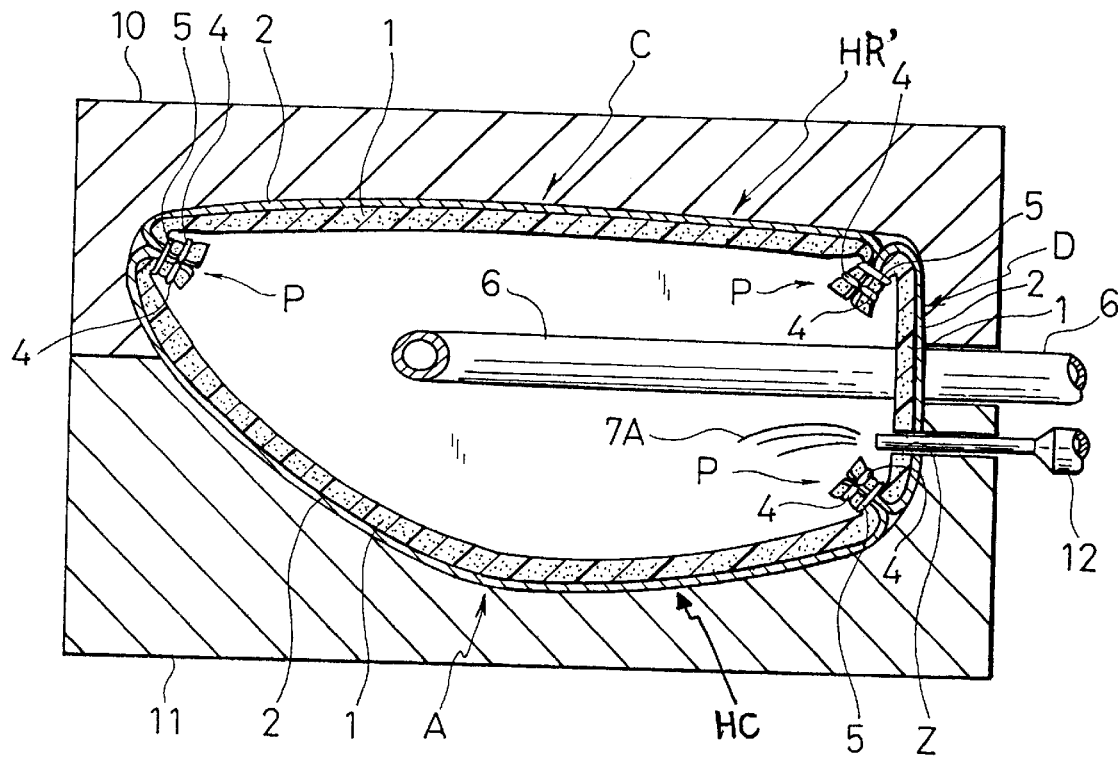

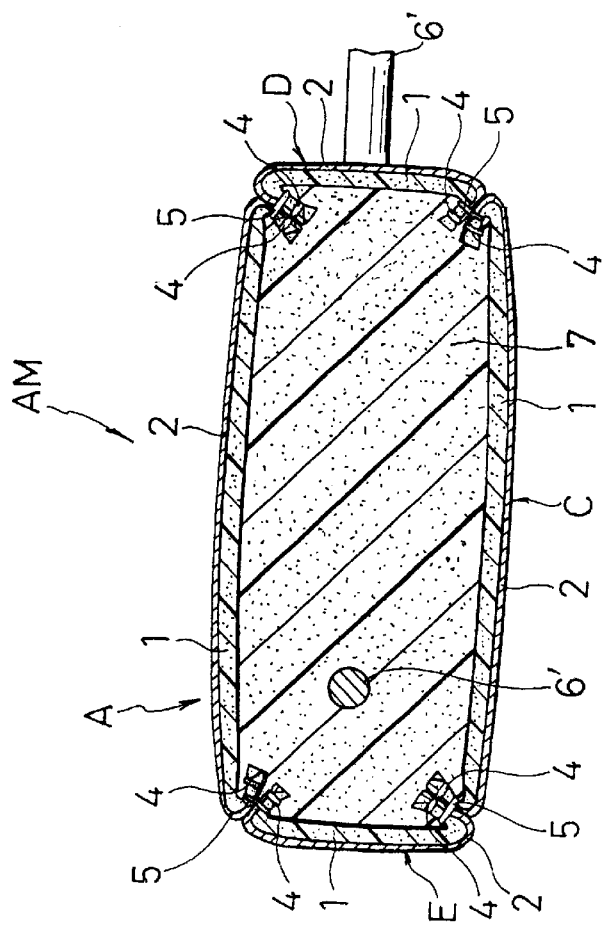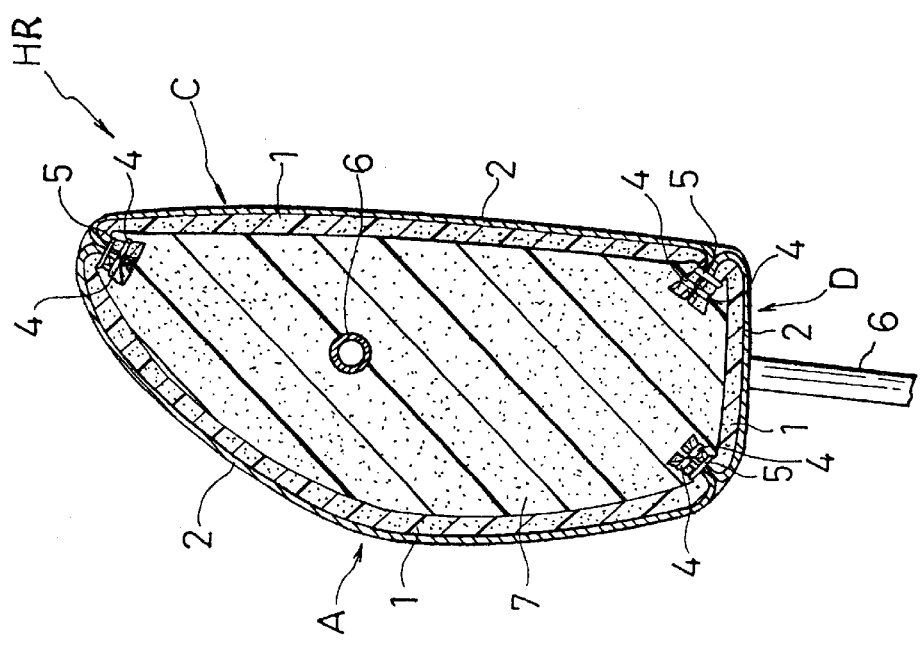

METHOD FOR FORMING A FOAMED PRODUCT INTEGRAL WITH TRIM COVER ASSEMBLY

BACKGROUND OF INVENTION

1. Field of the Invention

The present invention relates to a method for subjecting a trim cover assembly to foaming by injecting and curing a liquid foaming material therein, to thereby form a foamed product integral with the trim cover assembly, such as a headrest and armrest for use with an automotive seat.

2. Description of Prior Art

Seats, headrests, armrests and other cushiony accessories for use in automobiles are basically formed from a trim cover assembly and a foam padding. In particular, a typical process for forming a relatively small article, such as headrest or armrest, involves a foaming step wherein a liquid foaming material is injected and cured in a three-dimensional trim cover assembly to create a foam padding fill therein, together with a framework and some fittings if required, so as to produce a resulting foamed product integral with the trim cover assembly (e.g. headrest or armrest). In most cases, the three-dimensional trim cover assembly used is preformed by sewing together plural separate cover sections, each comprising a top cover layer (or surface cover piece) and a thin foam layer (or slab foam wadding piece), into a predetermined three-dimensional or box-like configuration that conforms to an outer shape of a resulting product.

In this kind of trim cover assembly, a natural or artificial leather material is sometimes required as the top cover layer thereof. Typically, the natural leather material includes a bull leather, a horse leather or the like, and the artificial leather material includes a synthetic resin leather or the like. In that instance, conventionally, a piece of leather surface cover material, be it of a natural or artificial leather, is adhesively laminated at its reverse side to a piece of thin foam padding to create one cover section unit which forms a part of a resulting three-dimensional trim cover assembly. However, in this particular lamination process, an adhesive is applied to whole areas of both leather surface cover piece and foam padding piece to thereby provide a bonded cover section unit. Such bonded cover section unit will inevitably cause objectionable wrinkles and creases therein when it is bent and curved by a worker for sewing with another bonded cover section unit (s). Further, in most cases, a plurality of the thus-bonded cover section units are first set in a reversed state where the foam padding layers thereof are exposed outwardly and then sewn together to form a reversed state of three-dimensional trim cover assembly (generally conforming to an outer shape of headrest or armrest, for instance) wherein all the foam padding layers are exposed outwardly while the leather surface cover layers are situated in the interior of trim cover assembly. Then, such reversed trim cover assembly is turned over from an opening thereof into an normal state where all the leather surface cover layers are exposed outwardly. This reversing process further causes additional wrinkles and creases in the resultant trim cover assembly, which impairs the aesthetic appearance of leather surfaces thereof.

To solve the problem, instead of the foregoing full lamination, it has been proposed to effect a partial connection between the leather surface cover piece and foam padding piece. That is, the peripheral end regions of the leather surface cover piece is adhesively attached or sewn along and with the corresponding peripheral terminal ends of foam padding piece to form a partially joined cover section unit. But, when a plurality of such cover section units undergo the abovementioned bending and curving by a worker in sewing them together and also undergo the reversing process for reversing the trim cover assembly into a normal state, the foam wadding layers are floated and waved from the leather surface layers, thus creating plural creased and bent areas in the foam wadding layers. Eventually, when subjecting the thus-formed trim cover assembly to a foaming process, there are a plurality of incompletely foamed spots at those creased and bent areas in the foam wadding layers.

SUMMARY OF THE INVENTION

In view of the above-stated drawbacks, it is therefore a primary purpose of the present invention to provide an improved method for forming a foamed product integral with trim cover assembly which insures to avoid creation of slack and crease in both of surface cover pieces and foam padding pieces of the trim cover assembly.

In order to attain such purpose, in accordance with the present invention, there is basically provided a method comprising the steps of:

forming a plurality of surface cover pieces in a predetermined shape, each having ends;

forming a plurality of foam padding pieces, each being small in size relative to each of the plurality of surface cover pieces and having ends;

juxtaposing each of the plurality of foam padding pieces on each of the plurality of surface cover pieces;

bringing the ends of each of the plurality of foam padding pieces in alignment with the ends of each of the plurality of surface cover pieces;

then, sewing the ends of each of the plurality of foam padding pieces with the ends of each of the plurality of surface cover pieces, thereby forming a plurality of sewn cover sections required to form a trim cover assembly in a predetermined three-dimensional shape;

thereafter, bending and sewing together end portions of the plurality of sewn cover sections such that the thus-sewn bent end portions of sewn cover sections face to a side where the plurality of foam padding pieces lie, thereby forming the trim cover assembly in the predetermined three-dimensional shape;

injecting a liquid foaming material into inside of the thus-formed trim cover assembly where the plurality of foam padding pieces face inwardly thereof;

curing and expanding the liquid foaming material so as to create a foam cushion member filled in the trim cover assembly, whereby the foamed product integral with the trim cover assembly is formed, Accordingly, due to the difference in size between the surface cover piece and foam padding piece, each of the foregoing cover sections has a slack region created in the surface cover piece relative to the foam padding piece, but the step of bending the ends of such cover sections is effective in stretching the slack region uniformly on and over the foam padding piece, thus avoiding creation of any slack and crease in both of the surface cover and foam padding pieces in the resulting foamed product. This is particularly effective in the case of the surface cover piece being a natural or artificial leather material. In other words, considering the nature of leather material which is easy to be slackened and creased, the foam padding piece is small in size to the leather surface cover piece, and all the peripheral ends of the foam padding piece are aligned and sewn with all the corresponding peripheral ends of the surface cover piece to create a slack region in the latter in advance, so that, subsequently, such slack region are stretched and juxtaposed uniformly and neatly on the foam padding piece by bending the thus-aligned and sewn peripheral ends of both two pieces at substantially a right angle relative to given bending lines.

In one aspect of the invention, the plurality of surface cover pieces may each be formed in a predetermined shape so as to have outwardly arcuate end portions and four corners, whereas each of the plurality of foam padding pieces, which is small in size relative to each of said plurality of surface cover pieces and has ends, may be formed such that the four corners thereof are diagonally equal to the respective four corners of each of said plurality of surface cover pieces. In that case, each of the plurality of foam padding pieces may be juxtaposed on each of the plurality of surface cover pieces in such a fashion that the four corners of each of said plurality of surface cover pieces match the respective four corners of each of said plurality of foam padding pieces, while the outwardly arcuate end portions of each of the plurality of surface cover pieces project from and peripherally of each of the plurality of foam padding pieces. Which will make it more easy to locate the foam padding piece relative to the surface cover piece and effectively create a proper slack region in the surface cover piece in the cover section which is obtained by sewing together the peripheral ends of both foam padding and surface cover pies as stated above.

Other various features and advantages will become apparent from reading of the descriptions hereinafter, with reference to the annexed drawings.

BRIEF DESCRIPTION OF THE DRAWINGS

FIG. 6 is a schematic perspective view of a three-dimensional headrest trim cover assembly formed by the method of the present invention;

FIG. 7 is a partly broken sectional view showing a foaming process where the headrest trim cover assembly with headrest stays is placed in a foaming die and a liquid foaming material is injected in the trim cover assembly;

FIG. 8 is a schematic perspective view of a resulting headrest finally formed by the method of the present invention;

FIG. 9 is a sectional view taken along the line IX—IX in the FIG. 8; and FIG. 10 is a sectional view showing an example where an armrest is formed by the method of the present invention.

DETAILED DESCRIPTION OF PREFERRED EMBODIMENT OF THE PRESENT INVENTION

At first, the generic purpose of the present invention is to provide a method for forming a foamed product integral with a trim cover assembly, as stated earlier. Thus, the term, "foamed product integral with trim cover assembly" is defined hereby to include various kinds of upholstered products formed under a foaming process comprising the steps of: providing a three-dimensional trim cover assembly; injecting a liquid foaming material into the inside of that trim cover assembly; and finally curing and expanding the liquid foaming material to create a foam cushion member filled in the trim cover assembly. By way of one example, in the herein-described embodiment, a headrest will be mainly explained as one of such various kinds of foam products integral with trim cover assembly. Reference being now made to FIGS. 1 through 9, description will be made of one preferred exemplary method for forming a headrest (as designated by (HR) in FIG. 8) in accordance with the present invention.

Figure 1:
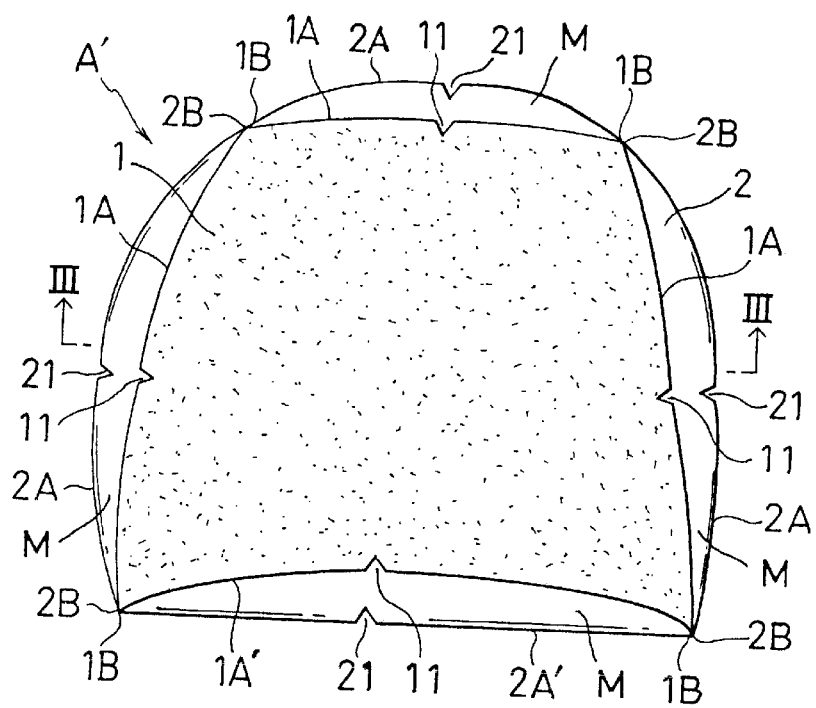
FIG. 1 is a schematic plan view showing the state where a foam padding piece is placed on a leather surface piece to provide a cover section unit in accordance with a method of the present invention.

As shown in FIG. 1, in accordance with the present invention, there are employed a surface cover piece (2) of a natural or artificial leather material and a thin foam wadding piece (1) formed from a slab urethane foam material, both of which constitute a basic material for forming a frontal cover section (A) of a resulting three-dimensional trim cover assembly (HC)(see FIG. 6) conforming to an outer shape of headrest. The leather material used for the surface cover piece (2) may include a bull leather, a horse leather, for instance, or artificial leather materials.

As can be seen from FIG. 1, the entire size of the surface cover piece (2) is larger than that of the foam wadding piece (1) by such an amount that creates a certain margin (M) projecting outwardly from the whole peripheral edges of that foam wadding piece (1), except that the diagonal lines of the former (2) are equal to the diagonal lines of the latter (1). In the illustrated embodiment, both whole shapes of the surface cover piece (2) and foam wadding piece (1) are substantially square, or strictly stated, of a generally trapezoidal contour, since they must be conformed as closely as possible to the particular trapezoidal configuration of frontal cover section (A) to be formed. This is however just an example and not limitative. The surface cover piece (2) has three convexly curved edges (2A), one generally rectilinear edge (2A'), and four corners (2B). On the other hand, the foam wadding piece (1) has three generally rectilinear edges (1A) and one slightly concave edge (1A'). Designations (21) denote four first location notches formed in the respective four edges (2A) of surface cover piece (2), and likewise, designations (11) denote four second location notches formed in the respective four edges (1B) of foam padding piece (1). It is noted that both first and second location notches (21)(11) are disposed at points corresponding to one another for a locating purpose to be described later.

Now, at the first step, one surface of the foam wadding piece (1) is placed and juxtaposed on the reverse surface of the surface cover piece (2), thus providing an initial cover section unit (A'), as in FIG. 1, in such a fashion that the four corners (1B) of the former (1) match the four corners (2B) of the latter (2), respectively, as they are equal in diagonal lines to each other. Thus, the foam wadding piece (1) is set in place upon the surface cover piece (2), with the four edges (2A, 2A') of the latter (2) projecting a certain amount, i.e. the margin (M), outwardly from the four edges (1A, 1A') of the former (1), as seen in both FIGS. 1 and 3.

Figure 2:
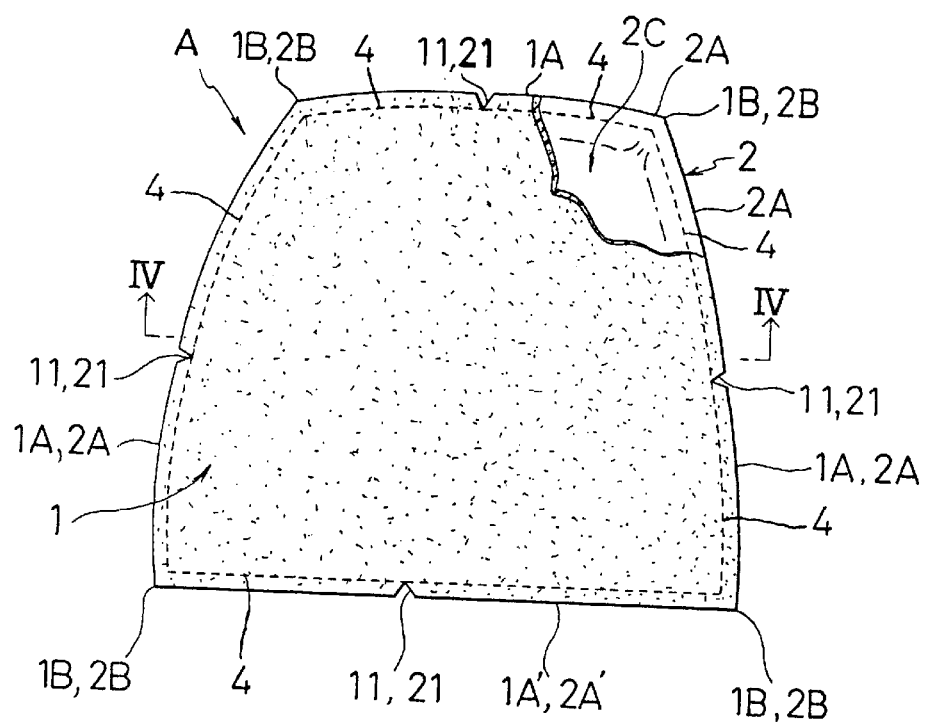
FIG. 2 is a schematic plan view showing the state where the peripheral ends of the foam padding piece are sewn with the peripheral ends of the leather surface piece.

Next, as can be seen from FIG. 2, each edge (1A or 1A') of the foam padding piece (1) is resiliently expanded outwardly and forcibly brought in alignment with the corresponding edge (2A, or 2A') of surface cover piece (2). At this point, both first and second location notches (12)(11) are matched with each other to insure precise location and mutual alignment of those two different edges (1A, 1A') and (2A, 2A'). Sewing is then performed to fixedly join the edges (1A, 1A') to and along the edges (2A, 2A') via a sewing thread (4). In that manner, all the four edges (1A, 1A') of foam padding piece (1) are respectively sewn with and along all the four edges (2A, 2A') of surface cover piece (2), whereupon there is produced a frontal cover section (A). As observed from FIGS. 2 and 4, an outwardly swollen or slack region (2C) is defined in the cover section (A). This creation of slack region (2C) is due to the difference in size between the foam padding piece (1) and surface cover piece (2), and also due to an elastic contraction of the foam padding piece (1) which gives an inwardly extending force attempting to draw the whole four edges (2A, 2A') of surface cover piece (2) toward the center thereof against the outwardly extending force inherent in the leather surface cover piece (2). In this regard, it is of course essential that the relative sizes between the foam padding piece (1) and surface cover piece (2) should be adjusted in advance so that a good balance is given between those outwardly and inwardly extending forces such as to substantially attain a predetermined contour of the frontal cover section (A) as shown in FIG. 2.

Figure 4:
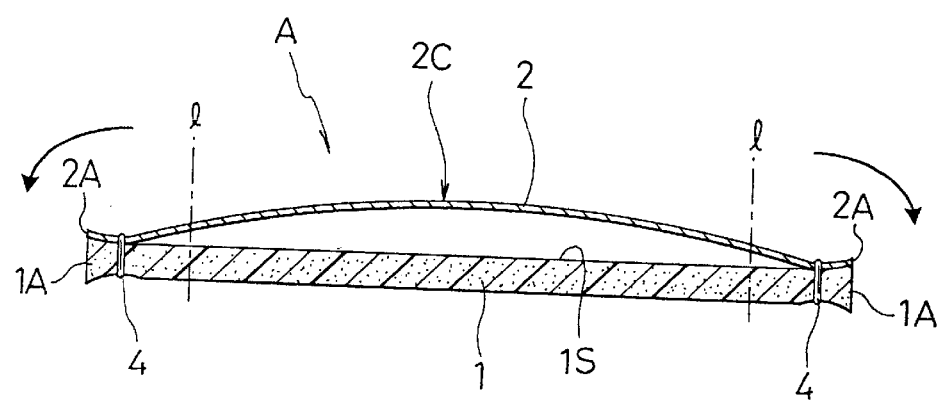
FIG. 4 is a sectional view taken along the line IV—IV in FIG. 2.
Figure 5:
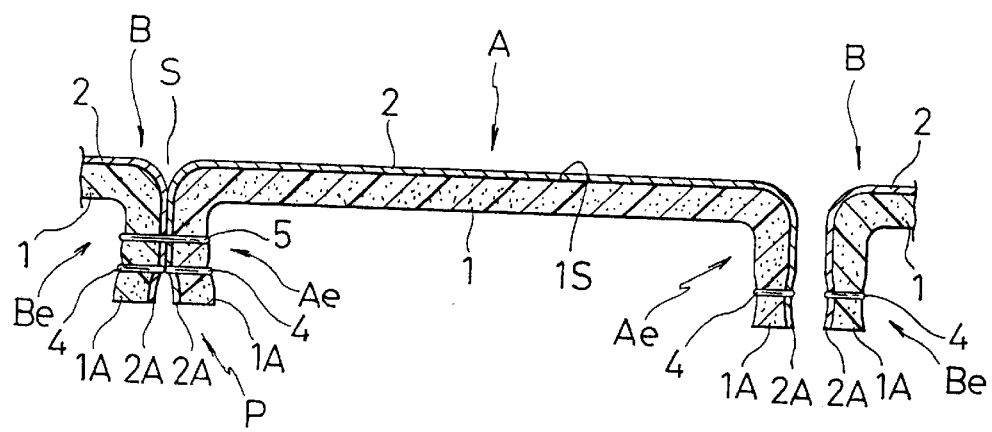
FIG. 5 is a partly broken section view showing the steps of bending the end portions of the cover section units and sewing the thus-bent end portions with one another.

Then, as indicated by the arrows in FIG. 4, all the sewn end portions (at 1A, 1A',2A 2A'and 4) of frontal cover section (A) are bent downwardly (i.e. in a direction toward a side where the foam padding piece (1) lies) at substantially a right angle relative to a predetermined bending line (l) in order that an entirety of the slack region (2C) of surface cover piece (2) is stretched uniformly and brought to a intimate, full contact upon a whole surface (1S) of the foam padding piece (1), as can be seen from FIG. 5. As a result, the cover section (A) is now formed with inwardly bent end portions (Ae) which serve as sewing end portions to be sewn with other cover sections as will be described later.

Figure 3:
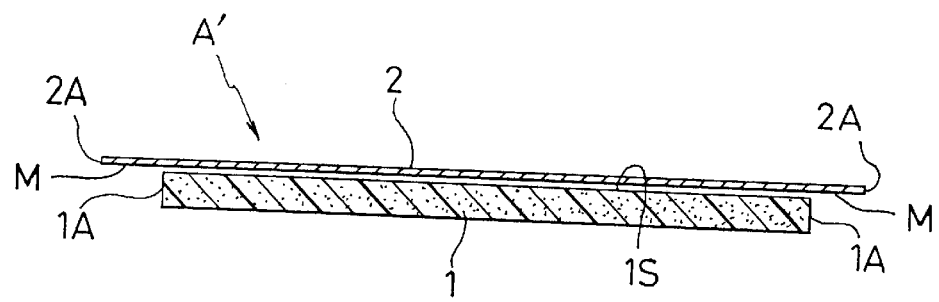
FIG. 3 is a sectional view taken along the line III—III in FIG. 1.

In this context, it is important to create a proper slack region (2C) in the surface cover piece (2) in the present invention, because the slack region (2C) must be stretched uniformly on and along the whole surface (1S) of foam padding piece (1) when bending the peripheral end portions of the cover section (A) at substantially a right angle For that purpose, the whole size of the surface cover piece (2) should be so larger than the whole size of the foam padding piece (1) that a proper amount of margin (M) of the surface cover piece (2) is defined from and peripherally of the foam padding piece (1), as indicated in FIGS. 1 and 3, the margin (M) being a key factor to cause a proper difference in size between the surface cover piece (2) and foam padding piece (1), which is suited for creating such slack region (2C) and achieving uniform stretching of surface cover piece (2) over and on the foam padding piece (1) when bending the sewn cover section (A) at substantially a right angle relative to the bending line (l). As such, the bending line (l) should also be set at a proper point inwardly of the sewn line (at 4) along the peripheral end regions of cover section (A) to achieve the foregoing uniform stretching.

While not shown, the same procedures and conditions as described above are effected to form other cover sections than the frontal cover section (A), such as a pair of side cover sections (B)(B), a rear cover section (C) and a bottom cover section (D), which can be seen from FIG. 6. That is, each of those cover sections (A, B, C and D) also comprises a leather surface piece (2) and a foam padding piece (1) and is subjected to substantially the same sewing and bending procedures as described above, creating a proper peripheral margin (as similar to the margin (M)), a proper slack region (as similar to the slack region (2C)), and bent end portions (as similar to the bent end portions (Ae)).

Then, for example, as shown in FIG. 5, two bent end portions (Ae) respectively of the two lateral sides of frontal cover section (A) are sewn by threads (5) with and along the corresponding bent end portions (Be) of each of the two side cover sections (B). Though not shown, likewise, other bent end portions (Ae) of the cover section (A) are sewn with the corresponding bent end portions of other remaining cover sections (C and D), so that a three-dimensional sewn body of trim cover assembly (HC) is formed as best seen in FIG. 6. In the FIG. 7, it is observed that all the bent end portions of cover sections (A)(C)(D) are sewn together to form projections (P) from the respective sewn junctures within the trim cover assembly, and thus a good stretch is caused in each surface cover piece or layer (2) which is therefore uniformly juxtaposed on each foam padding piece or layer (1) without any slack or crease therein.

Designations (H) and (Z), respectively, denote a pair of headrest stay holes and an injection hole. The two headrest stay holes (H) allow two headrest stays (6)(see FIG. 8) to pass therethrough, while the injection hole (Z) allows an injection nozzle (12) to be inserted therethrough into the interior of the trim cover assembly (HC).

The two headrest stays (6) are set in the trim cover assembly (HC), projecting through the respective two holes (H) to the outside, thereby producing an incomplete headrest unit as indicated by the designation (HR') in FIG. 7.

Referring now to the FIG. 7, the incomplete headrest unit (HR') is placed between upper and lower dies (10)(11), and thereafter, an injection nozzle (12) is inserted through the injection hole (Z) into the trim cover assembly (HC). A liquid base material (7A) is injected through the nozzle (12) into the inner hollow of trim cover assembly (HC). Then, foaming is effected to cure and expand the liquid base material (7A) within the trim cover assembly (HC) to create a foam cushion member (7) filled therein. It is noted here that, while not shown, a suitable impermeable layer is laminated on the outer surface of each foam padding piece or layer (1) which faces inwardly of the trim cover assembly (HC) with a view to preventing impregnation of the liquid foaming material (7A) into the foam padding layer (1).

Consequently, as shown in FIGS. 8 and 9, there is produced a resulting complete headrest (HR) with two stays (6) projecting therefrom. It is appreciated that the expanded mass of foam cushion member (7) causes a further uniform stretching of all the leather surface cover layers (2) on and over the foam padding layers (1), thereby positively avoiding creation of any slack and crease on the whole outer appearance of the headrest (HR).

FIG. 10 shows an example where an armrest (AM) can be formed by the method of the present invention. In this instance, though not clearly shown, a required number of preformed surface cover pieces (2) and foam padding pieces (1) are prepared as cover materials for providing six cover sections (for example at the designations (A)(C)(D) in FIG. 10) required to form an elongated exadedral body of trim cover assembly conforming to a resulting contour of armrest (AM), in contrast to the body of the above-described headrest (HR). Of course, as similar to all the processes for forming the headrest (H) as above, each foam padding piece (1) is small in size relative to each mating surface cover piece (2), except that those two pieces (1)(2) are equal in diagonal lines to each other. Needless to mention, there is the step of resiliently expanding the foam padding piece (1) outwardly on the surface cover piece (2) so that the four ends of the former (1) are brought in alignment with the respective four ends of the latter (2), (using location notches similar to the notches (11, 21)), and then those aligned ends are sewn together to provide one piece of cover section with a slack region created in the surface cover piece (2) as similar to the slack region (2C) shown in FIG. 4. The peripheral end portions of the thus-sewn cover section unit are bent at substantially a right angle with predetermined bending lines (similar to the bending lines (l)) so as to uniformly stretch the surface cover piece (2) on the foam padding piece (1). All the thus-bent end portions of one cover section are sewn with all the corresponding bent end portions of another cover section so as to provide a three-dimensional trim cover assembly contoured to the outer shape of armrest (AM). After having placed an armrest frame (6') in the trim cover assembly, a foaming is effect, as likewise in the case of headrest (HR) described earlier, to provide a resulting armrest (AM) as shown in FIG. 10.

It is noted again that the above descriptions are merely dedicated to exemplary modes of headrest and armrest, and that they are not limitative.

From the descriptions made thus far, it is appreciated that any slack and crease portions do not appear in the leather surface cover piece (2) fixedly attached to the foam padding piece (1), in contrast to the conventional method in which the two materials, whose sizes are equal to each other, are bonded fully or partially together. In accordance with the present invention, considering the nature of leather material which is easy to be slackened and creased, the foam padding piece (1) is made small in size to the leather surface cover piece (2), and all the peripheral ends of the foam padding piece (1) are aligned and sewn with all the corresponding peripheral ends of the surface cover piece (2) to create a slack region (2C) in the latter in advance, so that, subsequently, such slack region (2C) are stretched and juxtaposed uniformly and neatly on the foam padding piece (1) by bending the thus-aligned and sewn peripheral ends of both two pieces (1)(2) at substantially a right angel relative to given bending lines.

Finally, it should be understood that the present invention is not limited to the illustrated embodiment, but any other modifications, replacements and additions may be structurally and methodologically applied thereto without departing from the scopes of the appended claims.

What is claimed is:

1. Method for forming a foamed product integral with trim cover assembly, comprising the steps of:
   forming a plurality of surface cover pieces in a predetermined shape, each having ends;
   forming a plurality of foam padding pieces, each being small in size relative to each of said plurality of surface cover pieces and having ends;
   juxtaposing each of said plurality of foam padding pieces on each of said plurality of surface cover pieces;
   bringing said ends of said each of said plurality of foam padding pieces in alignment with said ends of said each of said plurality of surface cover pieces;
   then, sewing said ends of said each of said plurality of foam padding pieces with said ends of said each of said plurality of surface cover pieces, thereby forming a plurality of sewn cover sections required to form said trim cover assembly in a predetermined three-dimensional shape;
   thereafter, bending and sewing together end portions of said plurality of sewn cover sections, such that the thus-sewn bent end portions of said plurality of sewn cover sections face to a side where said plurality of foam padding pieces lie, thereby forming the trim cover assembly in said predetermined three-dimensional shape;
   injecting a liquid foaming material into inside of the thus-formed trim cover assembly where said plurality of foam padding pieces face inwardly thereof; and
   curing and expanding said liquid foaming material so as to create a foam cushion member filled in the trim cover assembly, whereby the foamed product integral with the trim cover assembly is formed, with said plurality of surface cover pieces stretched uniformly on and over the respective said plurality of foam padding pieces.

2. The method as defined in claim 1, wherein said each of said plurality of cover surface pieces is a piece of natural or artificial leather.

3. The method as defined in claim 1, wherein each of said plurality of cover sections has a slack region defined in the cover surface piece thereof, and wherein the method includes the step of bending the end portions of said plurality of cover sections at substantially a right angle with predetermined bending lines in a direction to said side where said plurality of foam padding pieces lie, whereby said slack region of the cover surface piece is stretched uniformly and brought to intimate and full contact upon said each of said plurality of foam padding pieces.

4. The method as defined in claim 1, wherein said foamed product with the trim cover assembly is a headrest or an armrest.

5. Method for forming a foamed product integral with trim cover assembly, comprising the steps of:
   forming a plurality of surface cover pieces in a predetermined shape, each having four corners and outwardly arcuate end portions;
   forming a plurality of foam padding pieces, each having four corners and ends, wherein each of said plurality of foam padding pieces is small in size relative to each of said plurality of surface cover pieces, except that said four corners of said each of the plurality of foam padding pieces are diagonally equal to the respective said four corners of said each of the plurality of surface cover pieces;
   juxtaposing said each of said plurality of foam padding pieces on said each of said plurality of surface cover pieces in such a fashion that the four corners of said each of said plurality of foam padding pieces match the respective four corners of said each of said plurality of surface cover pieces, while the outwardly arcuate end portions of said each of the plurality of surface cover pieces project from and peripherally of said each of the plurality of foam padding pieces;
   bringing said ends of said each of said plurality of foam padding pieces in alignment with said outwardly arcuate end portions of said each of the plurality of surface cover pieces, respectively;
   then, sewing said ends of said each of said plurality of foam padding pieces with said outwardly arcuate end portions of said each of said plurality of surface cover pieces, thereby providing a plurality of sewn cover sections required to form said trim cover assembly in a predetermined three-dimensional shape, wherein a slack region is defined in said each of the plurality of surface cover pieces with respect to said each of the plurality of foam padding pieces;
   thereafter, bending end portions of said plurality of cover sections at substantially a right angle with predetermined bending lines in a direction to a side where said plurality of foam padding pieces lie, whereby said slack region of the cover surface piece is stretched uniformly and brought to intimate and full contact upon said each of said plurality of foam padding pieces;

sewing together the bent end portions of said plurality of sewn cover sections, such that the thus-sewn bent end portions of said plurality of sewn cover sections face to said side where said plurality of foam padding pieces lie, thereby forming the trim cover assembly in said predetermined three-dimensional shape, injecting a liquid foaming material into inside of the thus formed trim cover assembly where said plurality of foam padding pieces face inwardly thereof; and curing and expanding said liquid foaming material so as to create a foam cushion member filled in the trim cover assembly, whereby the foamed product integral with the trim cover assembly is formed, with said plurality of surface cover pieces stretched uniform on and over the respective said plurality of foam padding pieces.

6. The method as defined in claim 5, wherein said each of said plurality surface pieces is a piece of natural or artificial leather.

7. The method as defined in claim 5, wherein said foamed product with the trim cover assembly is a headrest or an armrest.

* * * * *